United States Patent

[11] 3,538,827

| [72] | Inventor | Zyoichi Fuwa<br>Tokyo, Japan |
|---|---|---|
| [21] | Appl. No. | 674,778 |
| [22] | Filed | Oct. 12, 1967 |
| [45] | Patented | Nov. 10, 1970 |
| [73] | Assignee | Kabushiki Kaisha Ricoh<br>Tokyo, Japan<br>a corporation of Japan |

[54] X SYNCHRONIZATION MECHANISM FOR ELECTRIC SHUTTER CAMERA
1 Claim, 6 Drawing Figs.

| [52] | U.S. Cl. | 95/11.5 |
|---|---|---|
| [51] | Int. Cl. | G03b 9/70 |
| [50] | Field of Search | 95/11.5 |

[56] References Cited
UNITED STATES PATENTS

| 2,552,273 | 5/1951 | Fuerst | 95/11.5 |
|---|---|---|---|
| 2,949,072 | 8/1960 | Gebele | 95/11.5 |
| 3,095,793 | 7/1963 | Loose et al. | 95/11.5 |
| 3,200,723 | 8/1965 | Topaz | 95/11.5 |
| 3,362,310 | 1/1968 | Kitai | 95/11.5 |

*Primary Examiner*—Norton Ansher
*Assistant Examiner*—Fred L. Braun
*Attorney*—Burgess, Ryan & Hicks ABSTRACT: A flash synchronization mechanism for a photographic camera having an electric shutter device. The synchronization mechanism has an synchronization switch mounted on a first rotatable ring member which may be adjustably positioned to correspond to various aperture settings of the shutter device. The opening blades of the shutter device are mounted on a second ring member which is rotatable coaxially with the first ring member. The second ring member has a pin element thereon which projects into the path of the synchronization switch to close the switch in response to operation of the shutter device. The mechanism also has an arresting element for maintaining the synchronization switch in one of a number of predetermined positions during camera operation.

Patented Nov. 10, 1970

3,538,827

Zyoichi Funwa.

X SYNCHRONIZATION MECHANISM FOR ELECTRIC SHUTTER CAMERA

SUMMARY

Difficulties exist for utilization of "X" synchronizing contact in a camera having an electrical shutter but not having a diaphragm. This is because the maximum opening of the shutter is not always attainable in such camera, and the "X" contact in conventional construction operates at its maximum opening position of the shutter. To overcome these difficulties the operating time position of the "X" contact has been made adjustable by this invention.

This invention relates to a novel construction of "X" synchronization contact-operating mechanism which enables to use the "X" contact even in a camera which has an electric shutter but no diaphragm.

Heretofore, in a camera utilizing the electrical shutter, the shutter speed was adjusted automatically against the diaphragm aperture so that an exposure well adapted to the brightness of the object can be obtained. In other other words, the diaphragm aperture was determined at the first priority.

However, in the cameras having an electric shutter, certain types have no aperture-adjusting mechanism, and for such cameras, the flashlight photography employing a discharge tube-type flashlight (strobo-light) is not possible. This is apparent from the fact that since the camera has no aperture-adjusting mechanism, it is impossible to adjust the aperture to the most suitable value which is designated by the guide number of the strobo-light.

If the duration of the flashing light is considerably long as the case of the flashbulb (about 20 msec.), then it would be possible to close the shutter at a time position during the flashing period so that an appropriate exposure is obtained on the film surface. However, this is not possible for the case of discharge tube-type flashlight, the duration of which is extremely short (about 300 to 500 $\mu$sec.).

Conventionally, the "X" synchronization contact has been used specifically for the strobo-light or flashlight having almost no time delay, and, as shown in FIGS. 1 and 2, the contact is closed only when the shutter is fully opened. To be more particular, a control ring 1' of the shutter (shutter blades are not shown) located within the shutter casing has a pin 2', and the "X" contact $a'$ is placed in the rotating path of the pin 2'. As this result, when the control ring 1' is rotated rightwardly and comes to the position shown in FIG. 2, the "X" contact X is closed to operate the flashlight. In other words, the "X" synchronization contact is located on a stationary part of the camera, and it is closed only when the shutter blades are fully opened. For this reason, if the aperture-controlling diaphragm is not provided in the camera, the shutter cannot be full-opened and the "X" synchronization contact cannot be utilized.

Present invention is directed to overcome above-described drawbacks of the cameras having an electric shutter but not having the diaphragm, and shifting the position of the conventionally constructed "X" contact, the time position when the "X" contact is closed cooperating with the opening or closing of the shutter blades is made adjustable. In this case, the shutter blades are used as if an iris diaphragm, and at the same time the synchronization of flashing time position of the strobo-light can be realized.

BRIEF DESCRIPTION OF THE DRAWINGS

The invention will be made more apparent in the following description on the preferred embodiment when read in conjunction with the accompanying drawing, in which.

DETAILED DESCRIPTION OF THE DRAWINGS

It is supposed that the shutter included in this embodiment of the present invention comprises a set of blades which is specifically used for opening operation of the shutter (hereinafter called forward blades) and another set of blades which is specifically used for closing operation of the shutter (hereinafter called rear blades).

Figure 1:
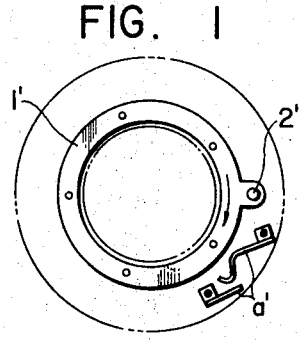
FIG. 1 is a plan view showing the construction of "X" synchronizing contact for the discharge tube-type flashlight which is provided in the conventional camera.
Figure 2:
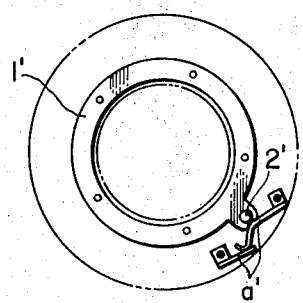
FIG. 2 is a similar plan view of the conventional camera where the "X" synchronizing contact is operating.
Figure 3:
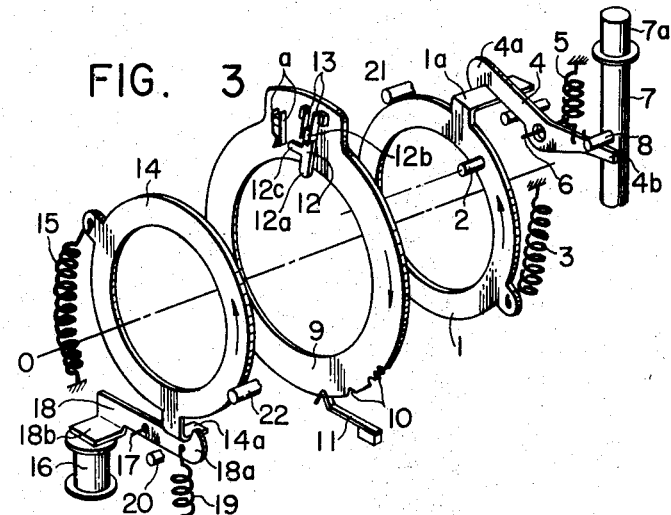
FIG. 3 is an exploded perspective view of an "X" synchronizing contact which constitutes one embodiment of the present invention, and only the important parts are indicated.
Figure 4:
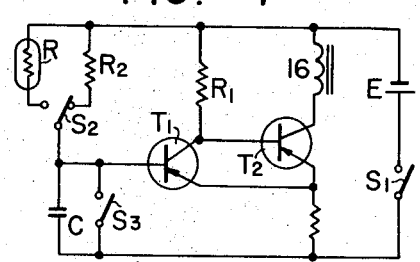
FIG. 4 illustrates one example of an electrical circuit which is utilized with this electrical shutter.

FIG. 3 illustrates an exploded perspective view of this embodiment wherein the "X" synchronizing contact according to this invention is combined with the electrical shutter, the electrical circuit of which is indicated in FIG. 4. The reference numeral 1 designates a control ring of the forward blades (not shown) which are pivotally mounted on the stationary portion such as the camera body or the shutter casing so that the blades are rotatable around the optical axis "O" of the lenses. This control ring 1 is urged in an anticlockwise direction by means of a tension spring 3, one end of which is attached to a stationary member, and in the normal condition, an arm 1a formed parallel with the optical axis "O" is provided on the periphery of the control ring 1. The arm 1a is caught by a hooked end 4a of a stopping lever 4 pivotally mounted on the stationary portion of camera. The stopping lever 4 is urged for anticlockwise rotation around an axis 6 by a tension spring 5, on the right end 4b of the stopping lever 4 rides, a pin 8 projecting from a shutter release rod 7. On the upper end of the shutter release rod 7, the shutter button 7a is provided, and pushing down the button 7a the stopping lever 4 is turned to clockwise rotation by means of the pin 8. The rotation of the stopping lever 4 causes disengagement of the hooked end 4a from the arm 1a and the control ring 1 is thereby rotated counterclockwise. When the control ring 1 rotates counterclockwise, a normally opened main switch S1 shown in FIG. 4 closes its contacts though the mechanical interconnection between them is omitted for the purpose of simplification of description.

On the control ring 1, there is provided a pin 2 which is to actuate the "X" contact. Since this pin 2 is provided on the front side of the control ring 1, it extends to move along the inner periphery of a separate ring 9 which is rotatable around the optical axis "O" of the camera. On the ring 9 at the outer periphery, a plurality of notches 10 are formed, and with these notches 10 and a plate spring 11 a click stop is provided. The positions of these notches 10 correspond to respective apertures of this shutter as will be described later on.

Summarizing the above description, when the shutter is released, the engagement between the hooked end 4a of the stopping lever 4 and the control ring 1 is released, and the ring 1 rotates counterclockwise under the action of the spring 3 until it is limited by a stopper. When the control ring 1 is stopped at the stopper, the shutter is considered fully opened, and assuming the angle through which the control ring 1 has rotated before it is stopped is equal to unity, the positions corresponding to the fractions of the shutter aperture are indented on the periphery of the ring 9 as described before.

A small lever 12 is further pivotally mounted on the ring 9, and an arm 12a of the same lever 12 protrudes into the rotating path of the pin 2 implanted on the control ring 1. Another arm 12b of the lever 12 is held between two plates springs 13 so that the arm 12b is at the neutral position when the arm 12a is free from the pin 2. The small lever 12 is provided with still another arm 12c which extends toward a moving contact of the "X" synchronization contact a. With these arrangement, when the forward blades control ring 1 rotates counterclockwise said pin 2 abuts said arm 12a of the small lever 12, and thereby causing the lever 12 to turn around its pivot, the "X" contact a is closed.

In front of the above-described ring 9, another control ring 14 for the rear blades (not shown) is disposed rotatable around the optical axis "O". This control ring 14 is urged by a tension spring 15, one end of which is attached to a fixed member of the camera, to the counterclockwise closing direction of the blades, and at the normal condition, the counterclockwise rotation is blocked by a member which is not shown in the drawing. However, when the shutter is released, engagement of this ring 14 and said member not shown is released, and at the same time the main switch S1 is closed as described before. Closing of the main switch S1 flows a current in the electric circuit of FIG. 4, and the above-described control ring 14 is now blocked from rotation by means of an electromagnet 16.

To be more particular, and arm 14a provided on the periphery of the control ring 14 is bent in parallel to the optical axis "O", and this arm 14a will be engaged with the hooked end 18a of a swingable lever 18 mounted on a fixed member of the camera through a pivot 17. The swingable lever 18 is urged for clockwise rotation by a tension spring 18 attached on the right end of the swingable lever 18, and in the normal condition, the clockwise rotation of the lever 18 is limited by a stopper 20. The left end of the swingable lever 18 is bent to forward so that an arm 18b parallel to the optical axis "O" is thereby formed. Under the arm 18b, an electromagnet 16 is disposed. This electromagnet 16 is included in the electrical shutter circuit shown in FIG. 4. In the same drawing, emitters of transistors T1 and T2 are connected with the anode of the power source battery E through the main switch S1, and the collectors of the transistors are connected with the cathode of the battery E through a resistor R1 and the electromagnet 16 respectively. The base of the transistor T2 is connected also to the collector of the transistor T1. Between the base and emitter of the transistor T1, a capacitor C is provided, and between the base and the cathode of the battery E, connected are a photoconductive element R, such as CdS, and a fixed resistor R2 through a transfer switch S2. The switch S2 is thrown to the photoconductive element side when a photograph is taken in ordinary manner, and thrown to the fixed resistor side when a flashlight photography is taken. A switch S3 shown in the drawing is for discharge of the capacitor C. Members 21 and 22 shown in FIG. 3 are the stoppers to limit the rotation of the forward blade control ring 1 and the rear blade control ring 14 respectively.

Now, the operation of the camera utilizing an electric shutter will be explained for the case wherein a strobo-light photography is taken. At first, the switch S2 in the electric shutter circuit as shown in FIG. 4 is transferred to the fixed resistor R2 side which is used for the flashlight photography, and, at the same time, the ring 9 is rotated so that the shutter aperture is set for instance to ⅛ (full-opened condition is determined to 1). Then the shutter release button 7 is pushed down. This closes the main switch S1 of the electric shutter circuit, and at the same time causes the forward blade control ring 1 to be disengaged from the stopping lever 4 and to rotate leftward.

At this moment, the rear blade control ring 14 is shifted its blocking means from the not shown blocking member to the electromagnet 16, which is energized at closure of the main switch S1, and the rear blades of the shutter are held at their opened position.

In the meantime when the forward blades control ring 1 rotates to the ⅛ opening position, the pin 2 implanted on the same ring 1 touches on an arm 12a of the small lever 12 provided on the ring 9. The small lever 12 is then turned leftward and the arm 12c of the same lever 12 pushes the movable contact of the "X" sychronization contact a to the stationary contact. Thus the "X" contact is closed, and the flashlight photography is taken at an aperture suitable to the brightness and distance of the object body.

Figure 5:
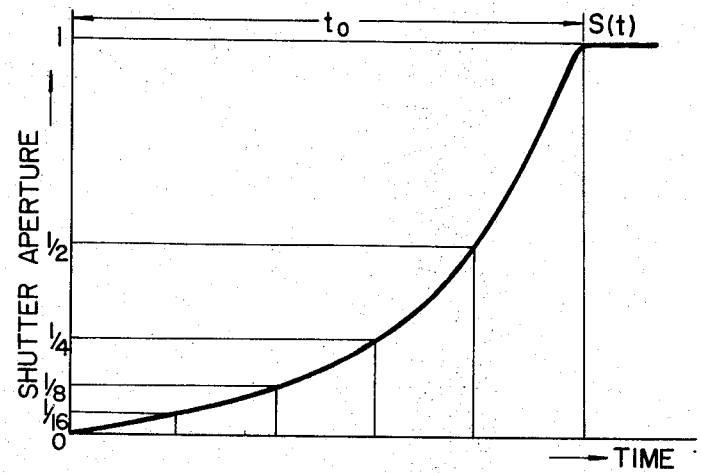
FIG. 5 is a graphical representation of shutter aperture variation with the shutter aperture indicated on the ordinate and the operation time indicated on the abscissa.
Figure 6:
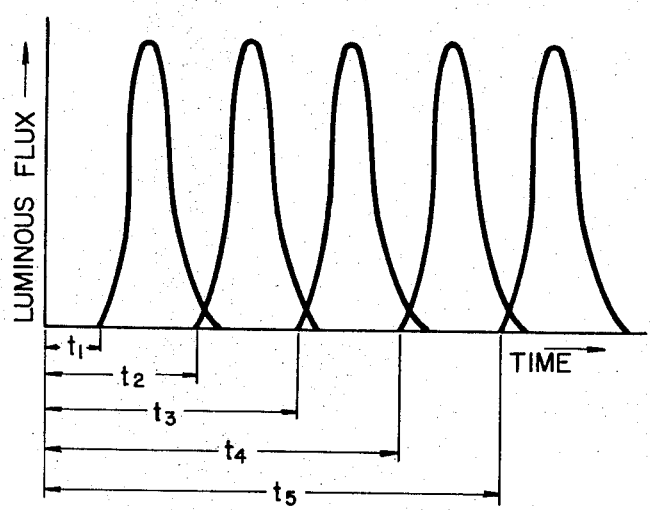
FIG. 6 is another graphical representation of luminous fluxes which is taken on the ordinate, and the operation time as in FIG. 5 is taken on the abscissa.

FIGS. 5 and 6 represent these relations in more details. In FIG. 5, the curve S(t) indicates the shutter aperture variation, with the shutter aperture such as 1, ½, ¼, ... taken on the ordinate and the operation time taken on the abscissa. It is seen that the shutter speed is accelerated, and at the maximum opening time of $t_o$, the speed is approximately equal to 2 msec. if the shutter can be operated freely.

FIG. 6 illustrates luminous flux of the discharge tube type flashlight (strobo-light) in respect of the time periods which are determined from those indicated in FIG. 5. Accordingly, since the present invention provides such an arrangement as described above, the peak value of the luminous flux will be obtained at the time position where the desired shutter aperture is achieved. That is, when the shutter aperture is set to ⅛, then the discharge tube starts to glow at the time of $t_2$ after the shutter started to open, and the peak value of the flashlight is obtained at the time position coincident with the time position at which the desired aperture of ⅛ is obtained.

Furthermore, for the purpose of improving the precision of the flashlight exposure control, the above mentioned $t_o$ can be extended, only while the flashlight photography is taken, by inserting a simple governor in the circuit. Or, it is also apparent that, in the above-described embodiment, through the opening operation of the forward shutter blades is utilized for controlling the flashing time position, the closing operation of the rear blades can also be utilized for the same purpose.

The shutter is so arranged that, when the switch S2 X" FIG. 4 is thrown to the flashlight operation side, the shutter is closed within a short time interval and the harmful effects of the hand releasing of the shutter or of any surrounding light can be eliminated. After this time interval, the rear blades of the shutter which was blocked its leftward rotation by the action of said electromagnet 16 will be instantaneously closed.

I claim:

1. An "X" synchronization contact means for an electronic flashlight to be used in an electrical shutter camera wherein the contact means to be closed in cooperation with the operation of the shutter blades is rotatably shiftable in a manner that the time position at which the contact is closed is made adjustable depending on the desired shutter aperture said contact means being mounted on a rotatable ring, means for arresting rotation of said ring in one of a number of rotary positions, said ring surrounding the rotary path of travel of a contact means actuating pin mounted on a second rotary ring and adapted to rotate about the same axis as said first ring, a spring bias means for rotating said second ring, a manually releasable retaining means for said second ring, manually operable means for releasing said second ring to permit rotation thereof by said spring bias means to close said contact means.

UNITED STATES PATENT OFFICE
CERTIFICATE OF CORRECTION

Patent No. 3538827            Dated November 10, 1970

Inventor(s) Zyoichi Fuwa

It is certified that error appears in the above-identified patent and that said Letters Patent are hereby corrected as shown below:

Column 1, line 47, delete "contact X"" and insert

-- contact a' --.

Signed and sealed this 15th day of June 1971.

(SEAL)
Attest:

EDWARD M. FLETCHER, JR.
Attesting Officer

WILLIAM E. SCHUYLER,
Commissioner of Patent